(12) United States Patent
Xu et al.

(10) Patent No.: US 8,724,998 B2
(45) Date of Patent: May 13, 2014

(54) CARRIER AND SUBCARRIER HOPPING FOR OPTICAL OFDM SECURITY

(75) Inventors: Lei Xu, Princeton, NJ (US); Dayou Qian, Princeton, NJ (US); Ting Wang, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 157 days.

(21) Appl. No.: 13/478,892

(22) Filed: May 23, 2012

(65) Prior Publication Data

US 2012/0321318 A1 Dec. 20, 2012

Related U.S. Application Data

(60) Provisional application No. 61/497,985, filed on Jun. 17, 2011.

(51) Int. Cl.
*H04B 10/04* (2006.01)
*H04J 14/00* (2006.01)

(52) U.S. Cl.
USPC ............................. 398/76; 398/183; 398/190

(58) Field of Classification Search
USPC .................................. 398/158, 183, 190, 76
See application file for complete search history.

(56) References Cited

U.S. PATENT DOCUMENTS

| | | | | |
|---|---|---|---|---|
| 7,418,209 B2* | 8/2008 | Salamon et al. | ............... | 398/185 |
| 7,656,931 B2* | 2/2010 | Smith et al. | ................... | 375/131 |
| 8,194,858 B2* | 6/2012 | Bukshpun et al. | ............ | 380/277 |
| 8,532,498 B2* | 9/2013 | Shpantzer | ..................... | 398/184 |
| 2002/0145787 A1* | 10/2002 | Shpantzer et al. | ............ | 359/136 |

OTHER PUBLICATIONS

Glesk, I., et al. "Novel Secure Platform for Avionic Applications Based on Optical CDMA" Proceedings of IEEE Fiber-Optics and Photonics Technology Conference. Oct. 2007. pp. 26-27.
Qian, D., et al. "108 GB/S OFDMA-PON With Polarization Multiplexing and Direct Detection" Journal of Lightwave Technology, vol. 28, No. 4. Feb. 2010. pp. 484-493.

* cited by examiner

*Primary Examiner* — Dalzid Singh
(74) *Attorney, Agent, or Firm* — Joseph Kolodka; Akitaka Kimura

(57) ABSTRACT

Methods and systems for secure communication include assigning data streams to respective orthogonal sub-carriers according to random number information at a transmitter. The data streams are modulated onto the respective orthogonal sub-carriers before the orthogonal sub-carriers are transmitted. The random number information is transmitted on a second medium, separate from the transmission medium. The orthogonal sub-carriers are received from the transmission medium at a receiver, while the random number information is received from the second medium at the receiver. The orthogonal sub-carriers are associated with data streams using the random number information and demodulated to produce data for the associated data stream.

20 Claims, 6 Drawing Sheets

US 8,724,998 B2

CARRIER AND SUBCARRIER HOPPING FOR OPTICAL OFDM SECURITY

RELATED APPLICATION INFORMATION

This application claims priority to provisional application Ser. No. 61/497,985 filed on Jun. 17, 2012, incorporated herein by reference.

BACKGROUND

1. Technical Field

The present invention relates to secure optical data communications and, in particular, to providing secure frequency-hopping in optical OFDM systems.

2. Description of the Related Art

Optical fiber systems form the backbone of global communication networks. As groups such as financial institutions, large corporations, and militaries demand greater security for their communications, providing additional security for the physical layer becomes important. Securing the physical layer may be performed alongside measures taken to secure higher network layers, such as encryption.

It is possible to tap an optical fiber to extract the transmitted information. One way to accomplish this is simply to bend the fiber past the point where all light is internally reflected, allowing some of the light to leak out. Although it was possible in the past to detect fiber tapping by noting an increase in signal attenuation, modern tapping techniques allow for tapping without significantly increasing the attenuation. However, even if the tapping is detected, this may be too late, as information has already been accessed.

One previous attempt to address this concern came in the form of orthogonal code division multiple access (CDMA), where digital bit information is encoded with a specially designed set of codes. At the receiver side, only users which have the knowledge of the codes can correctly decode the received signal and recover the transmitted bit information. Although CMDA is popular in wireless communications, optical CDMA has limited applications in optical communication networks.

SUMMARY

A method for secure communication includes assigning a data streams to respective orthogonal sub-carriers according to random number information at a transmitter, modulating the data streams onto the respective orthogonal sub-carriers, transmitting the orthogonal sub-carriers on a transmission medium, transmitting the random number information on a second medium, separate from the transmission medium, receiving the orthogonal sub-carriers from the transmission medium at a receiver, receiving the random number information from the second medium at the receiver, associating the orthogonal sub-carriers with data streams using the random number information, and demodulating each sub-carrier to produce data for the associated data stream.

A receiver includes a first reception unit configured to receive orthogonal sub-carriers from a transmission medium, a second reception unit configured to receive random number information from a second medium, a processor configured to associate the plurality of received orthogonal sub-carriers with respective data streams according to the received random number information, and a demodulator configured to extract data from each sub-carrier and further configured to add said data to the respective data stream.

A transmitter includes a random number generator configured to provide random number information, a processor configured to assign a plurality of data streams to respective orthogonal sub-carriers according to random number information, a modulator configured to modulate each data stream onto the respective sub-carrier, a first transmission unit configured to transmit the modulated sub-carriers on a transmission medium, and a second transmission unit configured to transmit the random number information on a second medium.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide additional physical layer security by changing the frequencies of transmissions in unpredictable ways. Scrambling transmissions in this way presents an eavesdropper from reassembling transmissions without knowledge of the key used to do the scrambling, said key being transmitted by a second, secure channel.

Figure 1:
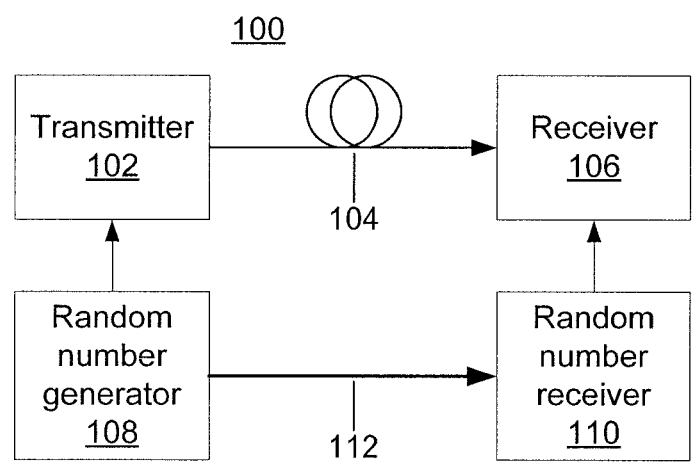
FIG. 1 is a diagram of a carrier-hopping optical communication system according to the present principles.

Referring now in detail to the figures in which like numerals represent the same or similar elements and initially to FIG. 1, an exemplary optical network 100 that employs frequency hopping is shown. The network 100 includes an optical transmitter 102 and an optical receiver 106. The transmitter 102 communicates with the receiver 106 via an optical medium 104. The medium 104 may be an optical fiber, but the present principles also apply to other forms of waveguide as well as to freespace transmission. The medium 104 may further be amplified or unamplified, and may be of arbitrary length. It should be noted that, although the present application is described specifically with respect to optical transmissions, the present principles may be applied to any form of communication that employs frequency/wavelength division multiplexing.

In addition, a random number generator and receiver 108 and 110 communicate over a private, secure link 112. Whereas the medium 104 may carry transmissions at high bit rates, such as, e.g., 40 Gb/s, 100 Gb/s, or greater, the secure link 112 may carry a much lower bit rate, e.g., on the order of Kb/s or Mb/s. It is important that the secure link 112 be highly reliable, because lost random number information will render some or all of the transmitted information unrecoverable. The secure link 112 may include any private form of communication, including a dedicated line-of-sight link, an encrypted connection via an alternative fiber or medium, or manual transmission of data whereby, e.g., a one-time pad is physically delivered to the receiver site by courier.

The random number information may be transmitted once, or may be periodically or continuously transmitted and updated. The random number generator 108 and receiver 110 respectively provide random number information to transmitter 102 and 106. The transmitter 102 uses the random number information to randomize the subcarriers and/or channels used for transmission, and the receiver 106 uses the information to recover the transmitted information.

The random number information may be, for example, a random number seed, used to generate a string of pseudo-random numbers from a known function, or may be a one-time pad. In this manner, potential eavesdroppers will be frustrated by an unpredictable shifting of information channels—anyone who lacks the random number information will be unable to reassemble a coherent data stream. Furthermore, the random number information may be structured or unstructured. In one exemplary embodiment, the random number information may be grouped into packets that adjust specific quantities and include timing/synchronization information. For example, there are multiple quantities that may be adjusted according to the random number information. Thus, one packet might apply to sub-carrier hopping, whereas another packet might include information to control channel hopping. Furthermore, the packets may be indexed or include time stamps that provide an explicit association between the random number information and particular symbols being transmitted.

Embodiments described herein may be entirely hardware, entirely software or including both hardware and software elements. In a preferred embodiment, the present invention is implemented partially in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem, fiber optic transmitter/receivers, and Ethernet cards are just a few of the currently available types of network adapters.

Figure 2:
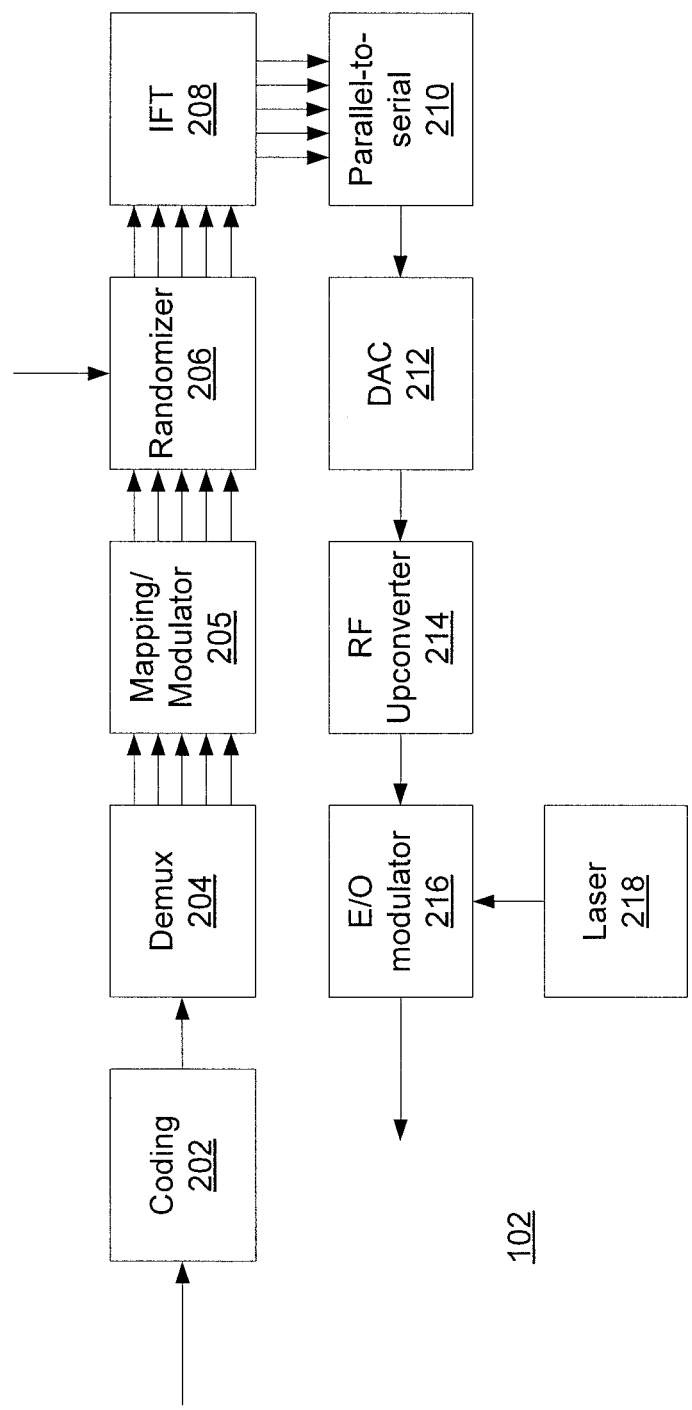
FIG. 2 is a diagram of a transmitter that performs channel and sub-carrier hopping in accordance with the present principles.

Referring now to FIG. 2, a more detailed diagram of transmitter 102 is shown. An input stream of data is provided to coder 202, which performs some form of error correction coding to make data transmissions more tolerant to loss. The coder may perform any appropriate form of coding, including the use of a low-density parity-check (LDPC) code, a turbo code, or a concatenated code that includes multiple types of codes. The coder 202 outputs a coded bitstream to demultiplexer 204. The demultiplexer 204 breaks the stream into a set of parallel component bit streams. The number of parallel streams will conform to a number of subcarriers or channels that the streams will be transmitted on.

The mapper/modulator 205 accepts the parallel bit streams from demultiplexer 204 and translates them into symbols in an appropriate modulation scheme. For example, the mapper/modulator 205 may employ a form of quadrature amplitude modulation (QAM) with a constellation size and formal selected according to the needs and capabilities of the optical system 100. It is contemplated that any other form of modulation, such as quadrature phase shift keying, may be employed instead of QAM.

The randomizer 206 accepts the data streams and assigns them to respective orthogonal frequency division multiplexing (OFDM) sub-carriers. This assignment is determined by a random key, provided by random number generator 108. As noted above, the random key may represent a seed for a pseudo-random function, a one-time pad, or a genuine random number generated by some appropriate method.

Although the random number generator 108 is shown as being a separate component in communication with the randomizer 206, it is contemplated that the functions of these two components may be performed by a single device. The randomizer 206 may change sub-carrier assignments periodically or at intervals determined by the random number information provided by random number generator 108. Furthermore, the randomizer 206 may shuffle the signals between a fixed set of sub-carriers, or may use new sub-carriers with each reassignment.

After the randomizer 206 assigns the data streams to their randomized sub-carriers, an inverse Fourier transform block 208 processes each signal before a parallel-to-serial converter 210 combines the signals into a single path. The combined signal path is converted from the digital domain to the analog domain by digital-to-analog converter (DAC) 212. A radio-frequency (RF) upconverter 214 modulates the analog signals to an RF carrier. An electrical/optical modulator 216 then modulates the RF signals onto an optical carrier generated by laser 218. The optical output of the electrical/optical modulator 216 is sent over transmission medium 104 to receiver 106.

It should be noted that, according to an alternative embodiment, the frequency of laser 218 may also be randomized according to random number information from random number generator 108. This may be used to perform optical channel hopping if multiple transmitter lasers are being used on a single fiber. In such a case, random number information may also be transmitted to other transmitters 100 on a given passive optical network, to prevent transmitters 102 from selecting overlapping frequencies.

Figure 3:
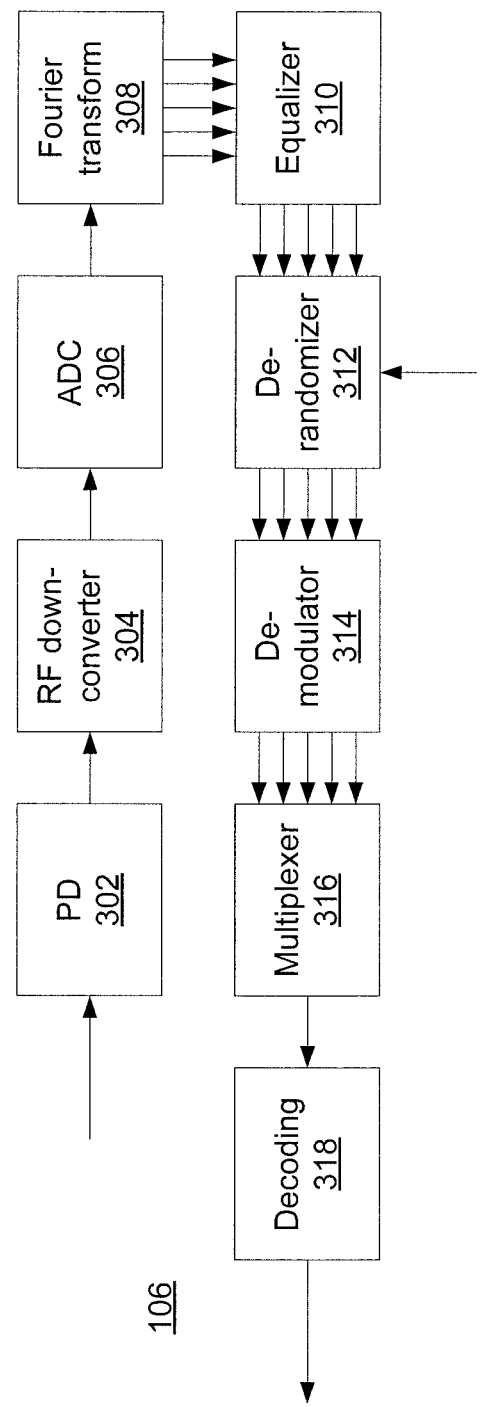
FIG. 3 is a diagram of a receiver that performs sub-carrier hopping in accordance with the present principles.

Referring now to FIG. 3, a more detailed diagram of receiver 106 is shown. A photodetector 302 receives a transmitted optical signal from transmission medium 104 and converts the optical signal to the electrical domain. RF down-converter 304 demodulates the signal from the RF carrier, and analog-to-digital converter (ADC) 306 converts the signal to the digital domain. A Fourier transform 308 separates the signal into its component sub-carriers, which pass to equalizer 310 for error correction, removing distortions, such as chromatic dispersion, which may have occurred during transit.

De-randomizer 312 coordinates the reception of the sub-carriers according to the random number information provided by random number receiver 110. As above, the random number receiver 110 is shown as being external to the receiver 106 and the de-randomizer 312, but the random number receiver 110 may alternatively be integrated with the de-randomizer 312. The de-randomizer 312 uses the provided random number information to determine which data streams are associated with which sub-carriers and reassembles the data streams accordingly. This process is performed in real-time and in coordination with the randomizer 206 of transmitter 102, such that sub-carrier reassignments take place in a coordinated fashion. If a delay occurs between sub-carrier reassignment at the transmitter 102 and the receiver 106, then information will be lost. As such, the private link 112 should have a very low latency, or the random number information should be transmitted in advance of data transmission. In addition, control information may be transmitted via the private link 112 or over the transmission medium 104 that provides synchronization information to the receiver.

A de-modulator 314 accepts symbol streams from the de-randomizer 312 and uses the same modulation scheme as the mapper/modulator 205 in transmitter 102 to extract bit streams. A multiplexer 316 assembles the bit streams into a single, coded bit stream, which a decoder 318 decodes. The output of decoder 318 matches the data stream input to the transmitter 102.

The optical system of FIGS. 2 and 3 shows randomized optical sub-carrier hopping, but this is only one embodiment of the present principles. In an alternative embodiment, inter-optical-channel carrier hopping can be used to change not only the OFDM sub-carrier assignments, but also the wavelength of the laser 218—this provides additional security when multiple wavelength division multiplexing channels are employed at the same time. When implementing transmitter 102, the only difference is that the random number generator 108 also provides information to the laser 218, said information also being communicated to random number receiver 110. Reception at the receiver 106 uses a different detection method to accommodate the multiple channels.

Figure 4:
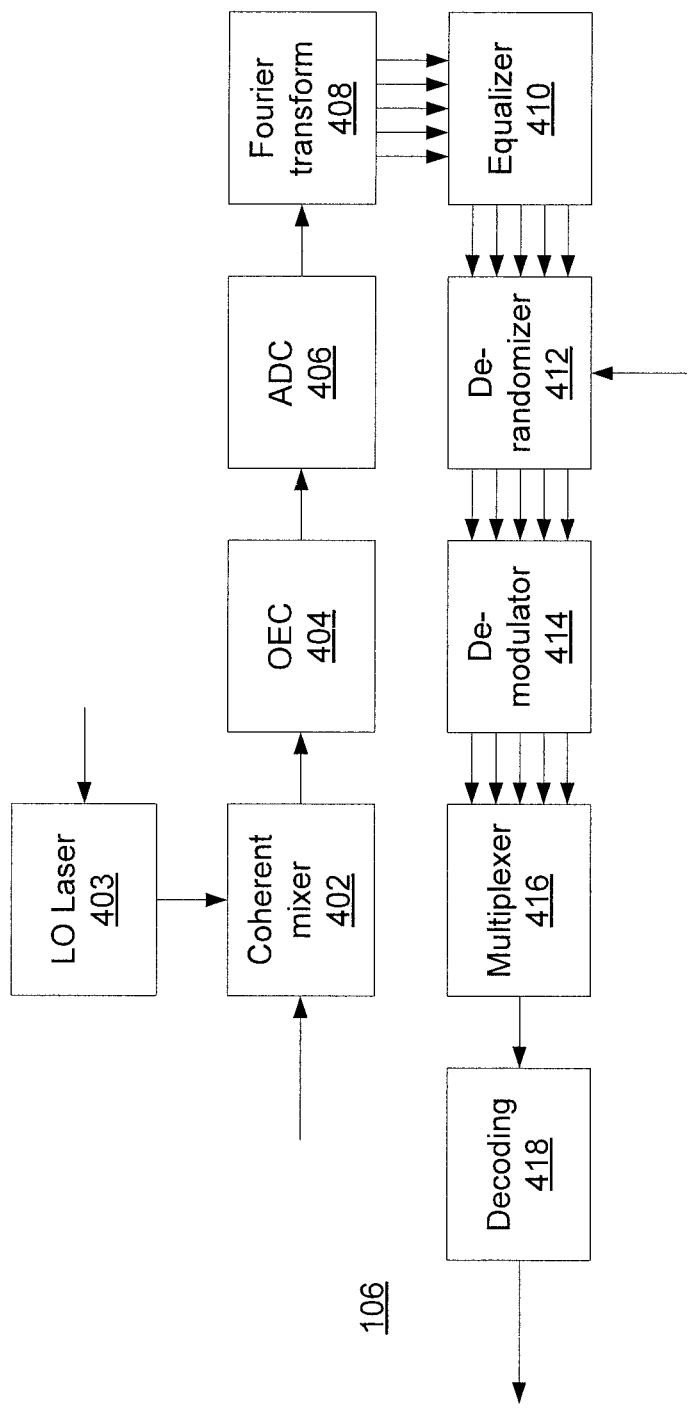
FIG. 4 is a diagram of a receiver that performs sub-carrier and channel hopping in accordance with the present principles.

Referring now to FIG. 4, an alternative embodiment of receiver 106 is shown with the ability to handle laser frequency hopping. A coherent detection approach is used, where a local oscillator laser 403 matches frequency hopping changes according to information provided by random number receiver 110. It should be noted that alternative detection methods may also be used, as long as they incorporate the random number information and use said information to track frequency reassignments. Coherent mixer 402 receives the transmitted signal from transmission medium 104 and, in conjunction with optical-to-electrical converter 404, detects the respective signals and converts them to analog electrical signals. This is done with the use of the local oscillator laser 403 to determine which data streams corresponded with which wavelengths.

ADC 406 converts the signal into the digital domain, and Fourier transform 408 splits the transmitted signal into its component sub-carriers. Equalizer 410 removes accumulated interference and provides clean signals to the de-randomizer 412, which uses random number information provided by random number receiver 110 to track sub-carrier hopping. De-modulator 414 extracts bit streams from the symbols encoded in the respective signals, multiplexer 416 combines the bit streams into a single data stream, and decoder 418 recovers the original data stream that was provided to the transmitter 102.

Figure 5:
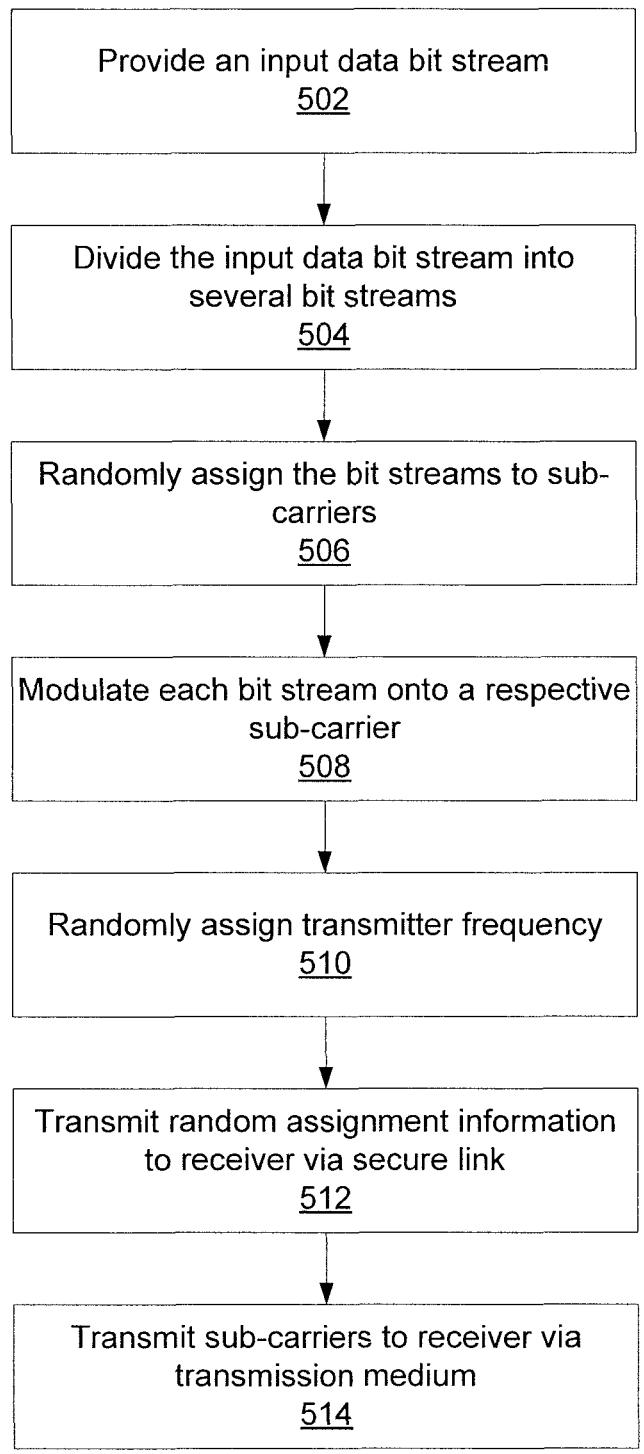
FIG. 5 is a block/flow diagram of a method of securely transmitting information using sub-carrier and channel hopping according to the present principles.

Referring now to FIG. 5, a method for intra-optical channel frequency hopping and optical carrier frequency hopping transmissions is shown. Block 502 provides an input data bit stream to a transmitter 102, the input data bit stream including information to be transmitted. Block 504 divides the data bit stream into multiple component bit streams. This may be performed at, e.g., demultiplexer 204, and the number of bit streams may be equal to a number of sub-carriers available for transmission. The number of bit streams may be less than the number of sub-carriers, but may not exceed it.

Block 506 randomly assigns the bit streams to sub-carriers. This operation may be performed at randomizer 206 as described above, and may be performed periodically or at intervals determined randomly. Block 506 uses random number information that may include a seed for a pseudo-random number generating function or a one-time pad. Block 508 uses the assignments of block 506 to modulate the bit streams onto their respective assigned sub-carriers.

Block 510 optionally randomly assigns the frequency of transmitting laser 218 according to random number information from random number generator 108. This may involve adjusting a single laser 218 if the laser has that capability, or it may involve switching between lasers to produce a signal at the assigned optical frequency.

Block 512 transmits random number assignment information from random number generator 108 to random number receiver 110 via a secure link 112. The secure link 112 should be highly reliable, because lost random number information will render some or all of the transmitted information unrecoverable. The secure link 112 may include any private form of communication, including a dedicated line-of-sight link, an encrypted connection via an alternative fiber or medium, or manual transmission of data whereby, e.g., a one-time pad is physically delivered to the receiver site by courier. Block 514 transmits the sub-carriers using laser 112 on the appropriate optical channel. The transmission takes place over transmission medium 104, which may include an optical fiber, freespace transmission, or any other appropriate form of optical medium.

As noted above, the random number information may be structured into packets. The packets may adjust specific quantities and include timing/synchronization information. For example, one packet might apply to sub-carrier hopping, whereas another packet might include information to control channel hopping. Furthermore, the packets may be indexed or include time stamps that provide an explicit association between the random number information and particular symbols being transmitted.

Figure 6:
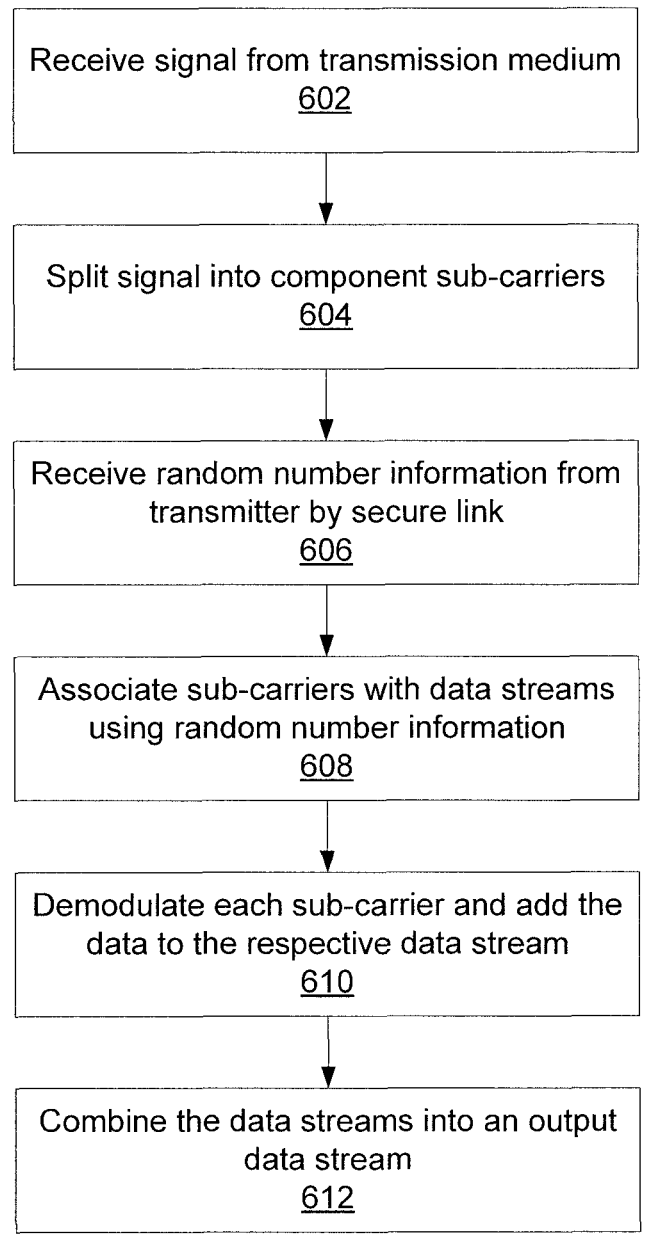
FIG. 6 is a block/flow diagram of a method of securely receiving information using sub-carrier and channel hopping according to the present principles.

Referring now to FIG. 6, a method for receiving transmissions that employ carrier hopping. Block 602 receives the signal from a transmission medium 104. As discussed above, the transmission may include any appropriate transmission medium. If optical channel is employed, receipt of the signal from the transmission medium 104 further includes using random number information to determine an appropriate reception wavelength. In the case of an optical medium, the receiver 106 may detect transmitted signal information using an appropriate photodetector 302 or coherent mixer 402.

Block 604 splits the signal into component sub-carriers using, e.g., a Fourier transform, to produce a set of scrambled input signals.

Block 606 receives the random number information at random number receiver 110 after transmission through the secure link 112. The random number information encodes sub-carrier assignments in some fashion, and the information may include other control information such as synchronization information, to aid in descrambling. Reception of the random number information at block 606 may include receiving and decoding packets that include the information, determining for example whether a given packet is associated with channel or with sub-carrier hopping and acquiring synchronization information to determine when to apply the new random number information.

Block 608 uses the random number information to associate sub-carriers with on-going data streams, providing continuity in data transmission. Block 610 demodulates the sub-carriers to extract the data encoded in them and adds that data to its respective data stream. Block 612 then combines the data streams into an output using, e.g., multiplexer 316.

Having described preferred embodiments of a system and method for carrier and sub-carrier hopping for optical OFDM security (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for secure communication, the method comprising:
    assigning a plurality of data streams to respective orthogonal frequency division multiplexing (OFDM) sub-carriers according to random number information at a transmitter;
    modulating the data streams onto the respective OFDM sub-carriers;
    transmitting the OFDM sub-carriers on a transmission medium;
    transmitting the random number information on a second medium, separate from the transmission medium;
    receiving the OFDM sub-carriers from the transmission medium at a receiver;
    receiving the random number information from the second medium at the receiver;
    associating the OFDM sub-carriers with data streams using the random number information; and
    demodulating each OFDM sub-carrier to produce data for the associated data stream.

2. The method of claim 1, wherein said transmitting and receiving the OFDM sub-carriers is performed using a channel frequency determined by the random number information.

3. The method of claim 1, further comprising periodically changing the channel frequency according to the random number information.

4. The method of claim 1, further comprising periodically reassigning the plurality of data streams to different respective OFDM sub-carriers according to the random number information.

5. The method of claim 1, wherein the transmission medium is an optical fiber.

6. The method of claim 1, wherein the random number information is a one-time pad.

7. The method of claim 1, wherein the random number information is a seed for a pseudo-random number generating function.

8. The method of claim 1, further comprising combining the data streams into an output data stream.

9. A receiver, comprising:
    a first reception unit configured to receive a plurality of OFDM sub-carriers from a transmission medium;
    a second reception unit configured to receive random number information from a second medium;
    a processor configured to associate the plurality of received OFDM sub-carriers with respective data streams according to the received random number information; and
    a demodulator configured to extract data from each OFDM sub-carrier and further configured to add said data to the respective data stream.

10. The receiver of claim 9, further comprising a local oscillator configured to enable reception of a signal comprising the received OFDM sub-carriers, wherein the local oscillator is configured to receive the signal using a frequency determined by the random number information.

11. The receiver of claim 10, wherein the local oscillator is configured to periodically change the frequency according to the random number information.

12. The receiver of claim 9, wherein the processor is further configured to periodically change the association between the OFDM sub-carriers and the data streams according to the random number information.

13. The receiver of claim 9, wherein the random number information is a one-time pad.

14. The receiver of claim 9, wherein the random number information is a seed for a pseudo-random number generating function.

15. A transmitter, comprising:
    a random number generator configured to provide random number information;
    a processor configured to assign a plurality of data streams to respective OFDM sub-carriers according to random number information;
    a modulator configured to modulate each data stream onto the respective OFDM sub-carrier;
    a first transmission unit configured to transmit the modulated OFDM sub-carriers on a transmission medium; and
    a second transmission unit configured to transmit the random number information on a second medium.

16. The transmitter of claim 15, wherein the first transmission unit is configured to change a frequency of transmission according to the random number information.

17. The transmitter of claim 16, wherein the first transmission unit is configured to periodically change the frequency of transmission.

18. The transmitter of claim 15, wherein the processor is further configured to periodically change the assignment of the plurality of data streams to the OFDM sub-carriers.

19. The transmitter of claim 15, wherein the random number information is split into packets that include information pertaining to a type of assignment and information establishing a correspondence between random number information in the packet and particular transmitted symbols.

20. The transmitter of claim 15, wherein the random number information is a seed for a pseudo-random number generating function.

* * * * *